(12) United States Patent
Goldner

(10) Patent No.: US 8,233,417 B1
(45) Date of Patent: Jul. 31, 2012

(54) FEMTOCELL ARCHITECTURE USING INTERNET PROTOCOL MULTIMEDIA SUBSYSTEM CENTRALIZED SERVICES

(75) Inventor: Alla Goldner, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 636 days.

(21) Appl. No.: 12/411,742

(22) Filed: Mar. 26, 2009

Related U.S. Application Data

(60) Provisional application No. 61/039,903, filed on Mar. 27, 2008.

(51) Int. Cl.
*H04B 7/00* (2006.01)
*H04W 4/00* (2009.01)
*H04L 12/56* (2006.01)
*H04M 3/42* (2006.01)

(52) U.S. Cl. ............... 370/310.2; 370/338; 370/352; 370/401; 455/414.1

(58) Field of Classification Search .............. 370/260, 370/331, 328, 338, 329, 337, 352, 354, 395.2; 455/410, 411, 414.1, 433, 435.1, 436, 437, 455/445, 450, 452.1, 452.2, 456.3, 458, 461, 455/466, 552.1, 560
See application file for complete search history.

(56) References Cited

U.S. PATENT DOCUMENTS

| | | | | |
|---|---|---|---|---|
| 7,970,398 | B2 * | 6/2011 | Palamara et al. | 455/435.1 |
| 8,027,681 | B2 * | 9/2011 | Burgess et al. | 455/436 |
| 2008/0096553 | A1 * | 4/2008 | Saksena et al. | 455/426.2 |
| 2008/0304462 | A1 * | 12/2008 | Burgess et al. | 370/342 |
| 2009/0129263 | A1 * | 5/2009 | Osborn | 370/230 |
| 2009/0129348 | A1 * | 5/2009 | Osborn | 370/338 |
| 2009/0170524 | A1 * | 7/2009 | Yoshizawa | 455/453 |
| 2010/0048174 | A1 * | 2/2010 | Osborn | 455/411 |
| 2010/0048176 | A1 * | 2/2010 | Osborn | 455/411 |

OTHER PUBLICATIONS

RFC 3775; Mobility Support in IPv6; D. Johnson, Rice University; C. Perkins, Nokia Research Center; J. Arkko, Ericsson; Jun. 2004; 165 pages.
RFC 3344; IP Mobility Support for IPv4; C. Perkins, Ed., Nokia Research Center; Aug. 2002; 99 pages.
3GPP TR 32.808 V8.0.0 (Jun. 2007); 3rd Generation Partnership Project; Technical Specification Group Services and System Aspects; Telecommunication management; Study of Common Profile Storage (CPS) Framework of User Data for network services and management (Release 8); 231 pages.
3GPP TR 21.905 V8.4.0 (Mar. 2008); 3rd Generation Partnership Project; Technical Specification Group Services and System Aspects; Vocabulary for 3GPP Specifications (Release 8); 56 pages.
3GPP TS 23.234 V7.6.0 (Dec. 2007); 3rd Generation Partnership Project; Technical Specification Group Services and System Aspects; 3GPP system to Wireless Local Area Network (WLAN) interworking; System description; (Release 7); 85 pages.

(Continued)

*Primary Examiner* — Tri H Phan

(57) ABSTRACT

A femtocell includes a transceiver that receives a first request signal from a first service request device (SRD) that operates in at least one of a circuit switched (CS) domain and a packet switched (PS) domain. A control module generates a second request signal based on the first request signal. The transceiver transmits the second request signal in at least one of the CS domain and the PS domain from the femtocell to a mobile switch center (MSC) server. The transceiver provides Internet protocol multimedia subsystem (IMS) centralized services (ICS) to the first SRD based on the second request signal.

26 Claims, 8 Drawing Sheets

OTHER PUBLICATIONS

3GPP TS 23.333 V8.0.1 (Mar. 2008); 3rd Generation Partnership Project; Technical Specification Group Core Network and Terminals; Multimedia Resource Function Controller (MRFC)-Multimedia Resource Function Processor (MRFP) Mp interface: Procedures Descriptions (Release 8); 72 pages.

3GPP TS 23.228 V8.4.0 (Mar. 2008); 3rd Generation Partnership Project; Technical Specification Group Services and System Aspects; IP Multimedia Subsystem (IMS); (Release 8); 234 pages.

3GPP TS 23.402 V8.1.1 (Mar. 2008); 3rd Generation Partnership Project; Technical Specification Group Services and System Aspects; Architecture enhancements for non-3GPP accesses (Release 8); 163 pages.

3GPP TR 23.882 V1.15.0 (Feb. 2008); 3rd Generation Partnership Project; Technical Specification Group Services and System Aspects; 3GPP System Architecture Evolution: Report on Technical Options and Conclusions; (Release 7); 263 pages.

3GPP TR 23.892 V8.0.1 (Mar. 2008); 3rd Generation Partnership Project; Technical Specification Group Services and System Aspects; IP Multimedia Subsystem (IMS) centralized services; (Release 8); 167 pages.

3GPP TS 24.008 V8.1.0 (Mar. 2008); 3rd Generation Partnership Project; Technical Specification Group Core Network and Terminals; Mobile radio interface Layer 3 specification; Core network protocols; Stage 3 (Release 8); 551 pages.

3GPP TS 23.292 V0.2.0 (Jan. 2008); 3rd Generation Partnership Project; Technical Specification Group Services and System Asp; IP Multimedia Subsystem (IMS) Centralized Services; Stage 2; (Release 8); 11 pages.

3GPP TS 23.002 V8.2.0 (Dec. 2007); 3rd Generation Partnership Project; Technical Specification Group Services and System Aspects; Network architecture (Release 8); 62 pages.

3GPP TS 22.101 8.8.0 (Mar. 2008); 3rd Generation Partnership Project; Technical Specification Group Services and System Aspects; Service aspects; Service principles (Release 8); 52 pages.

3GPP TS 23.008 V8.1.0 (Mar. 2008); 3rd Generation Partnership Project; Technical Specification Group Services and System Aspects; Organization of subscriber data (Release 8); 74 pages.

* cited by examiner

US 8,233,417 B1

FEMTOCELL ARCHITECTURE USING INTERNET PROTOCOL MULTIMEDIA SUBSYSTEM CENTRALIZED SERVICES

CROSS-REFERENCE TO RELATED APPLICATIONS

This application claims the benefit of U.S. Provisional Application No. 61/039,903, filed on Mar. 27, 2008. The disclosure of the above application is incorporated herein by reference in its entirety.

FIELD

The present disclosure relates to communication systems, and more particularly to architectures and protocols for access by terminals to IMS centralized services.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In FIG. 1, a third generation (3G) access network 10 is shown. A mobile terminal 12 referred to as user equipment (UE) accesses the 3G access network 10 via a nodeB base station (nB) 14 to receive services. The UE 12 may be a circuit switched (CS) or packet switched (PS) device. The services may include telephony services (e.g. voice, data, video, etc.) and/or supplemental services (e.g. call waiting, conference call, communication transfer, etc.). The services may be received over the Internet 16 via a radio network controller (RNC) 18.

The RNC 18 communicates with a CS core network 20 when communicating in a CS domain and with a PS core network 22 when communicating in a PS domain. The CS domain has associated services and core network (CN) entities. The PS domain has associated services and CN entities. The CS domain and the PS domain are defined in $3^{rd}$ Generation Partnership Project (3GPP™) technical specification (TS) 23.002 "Network Architecture", which is incorporated herein by reference in its entirety.

The RNC 18 communicates with one of multiple mobile switch centers (MSCs) 24 when receiving services from an operator of the CS core network 20. The RNC 18 communicates with a gateway general packet radio service (GPRS) support node (GGSN) 26 via a serving GSN (SGSN) 28 when receiving services from an operator of the PS core entwork 22. The PS core network 22 accesses a call center control function entity 32 of an Internet protocol (IP) multimedia subsystem (IMS) 30 to provide IMS services, which may include telephony and supplemental services.

SUMMARY

In one embodiment, a femtocell is provided that includes a transceiver that receives a first request signal from a first service request device (SRD) that operates in at least one of a circuit switched (CS) domain and a packet switched (PS) domain. A control module generates a second request signal based on the first request signal. The transceiver transmits the second request signal in at least one of the CS domain and the PS domain from the femtocell to a mobile switch center (MSC) server. The transceiver provides Internet protocol multimedia subsystem (IMS) centralized services (ICS) to the first SRD based on the second request signal.

In other features, an ICS system is provided that includes the femtocell and further includes the MSC server. The MSC server is ICS enhanced and converts CS domain signals from the femtocell to at least one of PS domain signals and IMS domain signals.

In other features, an ICS system is provided that includes the femtocell and further includes the MSC server and a gateway. The transceiver transmits and receives control signals for the ICS to and from the MSC server and transmits and receives user data signals for the ICS to and from the gateway.

In other features, a home node base station system is provided and includes a femtocell. The femtocell includes a transceiver that receives a first request signal from a SRD that operates in at least one of a CS domain and a PS domain. A control module generates a second request signal based on the first request signal. A home node base station gateway communicates with the femtocell. A MSC server communicates with the home node base station gateway and an IMS. The transceiver transmits the second request signal in at least one of the CS domain and the PS domain from the femtocell to the MSC server. The transceiver provides ICS to the SRD based on the second request signal.

In other features, a method of operating a system that includes a femtocell is provided. A first request signal is received by the femtocell from a SRD that operates in at least one of a CS domain and a PS domain. A second request signal is generated based on the first request signal. The second request signal is transmitted in at least one of the CS domain and the PS domain from the femtocell to a MSC server. ICS is provided to the SRD based on the second request signal.

In other features, a method of operating a home node base station system is provided. A first request signal is received by a femtocell from a SRD that operates in at least one of a CS domain and a PS domain. A second request signal is generated based on the first request signal. The second request signal is transmitted in at least one of the CS domain and the PS domain from the femtocell to a MSC server via a home node base station gateway. ICS is provided from an IMS to the SRD based on the second request signal.

In other features, a method of SRD registration and ICS service is provided that includes receiving a first request signal by a femtocell from a non-ICS SRD that operates in at least one of a CS domain and a PS domain. A second request signal is generated and the first request signal is transmitted to a service centralization and continuity application server (SCC AS) via the femtocell based on domain of the non-ICS SRD. The non-ICS SRD is registered via a MSC server when the second request signal is generated. The non-ICS SRD is registered via at least one of the SCC AS and a CSCF when the first request signal is transmitted to the SCC AS. ICS is provided to the non-ICS SRD based on one of the first request signal and the second request signal.

In still other features, the systems and methods described above can be implemented by a computer program executable by one or more programmable processors to perform functions by operating on input data and generating output. The computer program can reside on a computer readable medium such as but not limited to memory, nonvolatile data storage, and/or other suitable tangible storage mediums.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
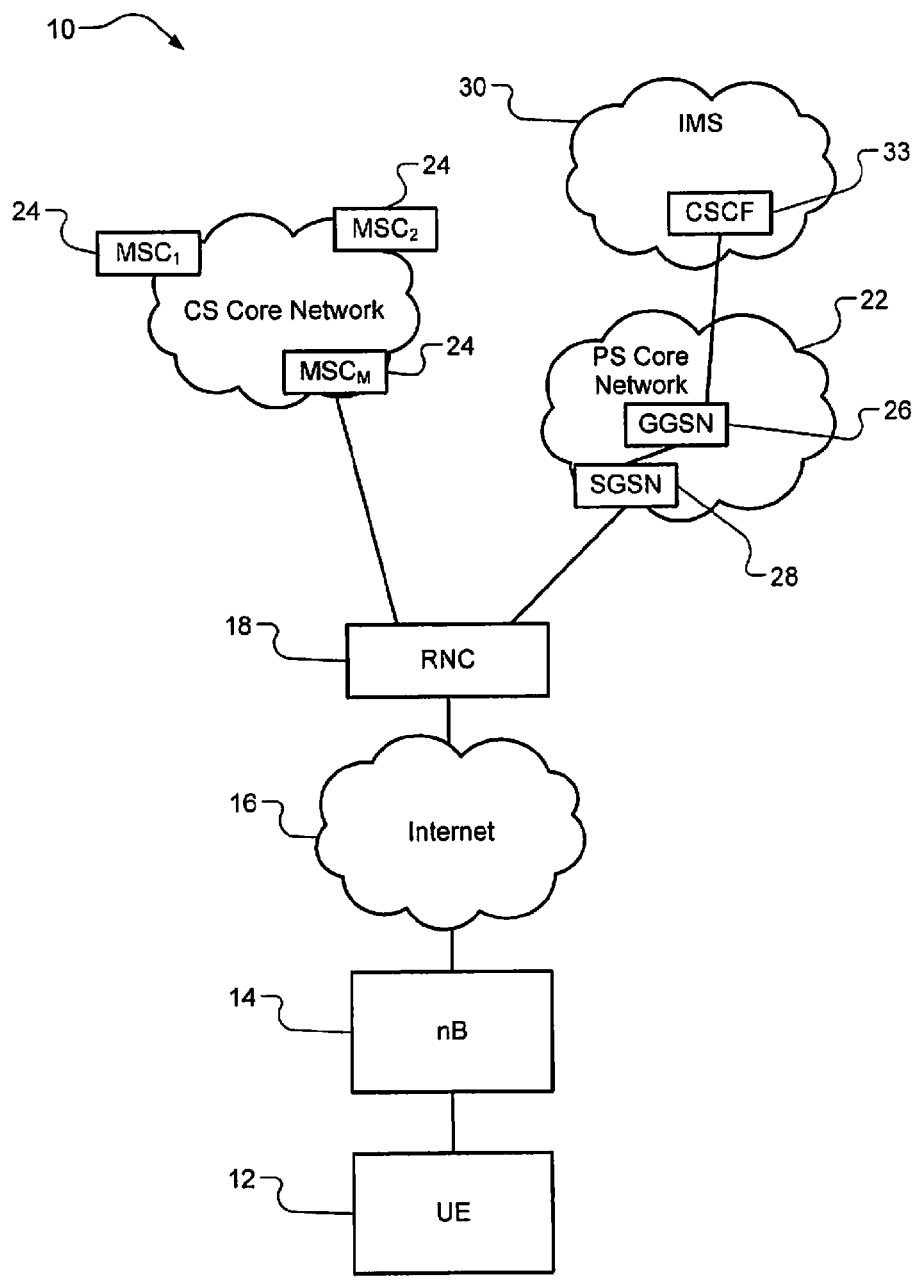
FIG. 1 is a functional block diagram of an network system.

The following description is provided merely as an illustrative example and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a service request device (SRD) may refer to user equipment (UE) and/or a mobile node. A SRD may include equipment of an end user, such as a processor, a radio interface adaptor, etc. An SRD may include a mobile network device, a personal data assistant (PDA), a computer, etc.

Also, in the following description, the term mobility protocol may include a local mobility protocol and/or a global mobility protocol. A local mobility protocol may refer to a communication protocol used for mobility by a SRD between access points of a network, such as a public land mobile network (PLMN). The access points are in communication with different access routers. A global mobility protocol refers to a communication protocol used for mobility by a SRD between access points of different networks. The different networks may be different PLMNs.

A mobility protocol may include a mobile Internet protocol (MIP), which may refer to a host-based or a network-based IP. Internet Engineering Task Force (IETF) RFC 3344 and IETF RFC 3775 are incorporated herein by reference in their entirety. A host-based IP may include a client mobile IP (CMIP), such as CMIPv4 and CMIPv6, or a dual stack mobile IP (DSMIP). A host-based IP is used when mobility management is handled by a SRD. A network-based IP may include a proxy MIP (PMIP), such as PMIPv4 and PMIPv6. A network-based IP may be used, for example, when mobility management is handled by a mobility management entity (MME), a gateway, or other network device on behalf of a SRD.

In addition, in the following description various networks and network devices are disclosed. Although a particular number of each network device is shown, any number of each network device may be included. For example, in a home network and or a visited network any number of wireless access gateways (WAGs), home subscriber servers (HSSs), authentication authorization and accounting (AAA) servers, etc. may be included. Selection of one of each of the devices may be performed during communication with a SRD. Each of the network devices may be considered a remote network device relative to another network device.

Also, the terms "$3^{rd}$ generation device", "$3^{rd}$ generation network", "$3^{rd}$ generation Internet protocol (IP) access network", "$3^{rd}$ generation access", "$3^{rd}$ generation services", "$3^{rd}$ generation operators", and "$3^{rd}$ generation access device" may refer to devices, networks, operators, and accesses that are configured to operate in a 3GPP™ system, are able to obtain 3GPP™ access, include or provide 3GPP™ services, and/or include and/or are able to operate based on 3GPP™ protocols. The terms "non-$3^{rd}$ generation device", "non-$3^{rd}$ generation network", "non-$3^{rd}$ generation Internet protocol (IP) access network", "non-$3^{rd}$ generation access", "non-$3^{rd}$ generation services", "non-$3^{rd}$ generation operators", and "non-$3^{rd}$ generation access device" may refer to devices, networks, operators and accesses that are not configured to operate in a 3GPP™ system, are not able to obtain 3GPP™ access, do not include or provide 3GPP™ services, and/or do not include or operate based on 3GPP™ protocols.

A SRD may establish connectivity service in a home network where a service is initially registered. This is referred to as a non-roaming location. A SRD may also establish connectivity in a visitor network, which is referred to as a roaming location. The SRD may establish connectivity via $3^{rd}$ generation IP access network or a non-$3^{rd}$ generation IP access network. In a non-roaming scenario or roaming scenario a mobile operator (e.g. T-mobile™ and AT&T™) of respectively a home PLMN (hPLMN) and a visited PLMN (vPLMN) provides services to the SRD.

An SRD may be a circuit switched (CS) and/or packet switched (PS) enhanced device. The term enhanced refers to the ability of a device to support communication in a particular domain and/or to support certain services and corresponding protocols. An SRD may receive IP multimedia subsystem (IMS) services. IMS services include IP multimedia services, such as audio, video, text, chat, etc and supplemental services, which are provided over a PS domain. The supplemental services may include call forwarding, barring, hold, resume, 3-way calling, etc. Multiple SRDs may be associated with a single user or account and may obtain access in a residential or non-residential setting. The residential and non-residential settings may have limited coverage. To improve coverage a femtocell may be used between the SRDs and an access network.

A femtocell may be referred to as an access point base station or a home nodeB base station (HNB). A femtocell is a cellular base station that may be used, for example, in a home or business to communicate with cellular user equipment devices. A femtocell may be used in various residential and non-residential environments. A femtocell may connect to a service provider network via a broadband communication link, such as a digital subscriber line (DSL) or cable, for example. A femtocell allows multiple mobile or wireless terminals (e.g. 2-5 mobile terminals) to communicate with a service provider with improved connectivity. A service provider is able to extend service coverage indoors in areas where coverage would be limited or degraded without use of a femtocell. A femtocell can improve coverage and capacity for the introduction of additional terminals and services.

When a SRD, for example, moves out of range of a corresponding femtocell, a handoff may occur between the femtocell and a macro-cellular network. Voice-call-continuity (VCC) is needed to provide handoff functions, such as between PS and CS domains. Also, a bifurcation of services can exist before and/or as a result of the handoff. For example, voice call services may be provided in the CS domain, whereas supplemental services may be provided in the PS domain. In addition, an SRD may have a different experience when receiving services in the CS domain versus the PS domain.

To provide consistency when accessing services using CS and PS enhanced devices, the techniques and architectures described herein provide IMS centralized services (ICS) to SRDs. Telephony and supplemental services are provided to the SRDs through ICS and may include the use of a femtocell. The SRDs 12 may request various real-time and non-real-time services, such as Web browsing, voice over Internet phone (VoIP), electronic mail (email), and real-time IP multimedia, as well as conversational and streaming services. The SRDs may be ICS or non-ICS enhanced. The SRDs may be VCC or non-VCC based. The femtocell may be CS and/or PS enhanced. A non-ICS enhanced SRD refers to a SRD that supports a domain other than a PS and/or IMS domain. A SRD that is non-VCC based refers to a SRD that does not support VCC. The femtocells may also be ICS or non-ICS enhanced.

ICS is one application of an IMS and refers to the use of an IMS application server that manages SRD sessions of a user that include the reception of IMS services. Each SRD of a user may be active and receive services during the same time period. The reception of ICS services may be provided from the ICS application server via a mobile switch center (MSC) server. The MSC server is ICS enhanced and communicates with the ICS application server on behalf of the SRDs. The ICS application server provides telephony and supplemental services. ICS is further described in 3GPP™ technical report (TR) 23.892 "IP Multimedia Subsystem (IMS) centralized services" and in 3GPP™ technical specification (TS) 23.292 "IP Multimedia Subsystem (IMS) centralized services", which are incorporated herein by reference in their entirety.

A MSC server may be enhanced for the support of ICS according to 3GPP™ TS 23.292. The MSC server may comply with 3GPP™ TS23.002 "Network Architecture", which is incorporated herein by reference in its entirety. The MSC server may process user-network signaling received over an A/Iu interface and an E interface for interworking with a 3GPP™ session initiated protocol (SIP) and vice versa. An A/Iu interface may refer to an interface between the MSC server and a base station or a radio network subsystem. An E interface may refer to an interface between MSC servers. The MSC server controls media gateway (MGVV) functions as described in 3GPP™ TS 23.002 to enable interworking between CS access and real time protocol (RTP) bearers. A bearer refers to a set of network resources and data transport functions that are used to delivery user traffic between two network entities. A bearer may include a logical or a physical connection, may define a specific route, and may include quality of service parameters. The MSC server performs the interworking between H.245 and SIP/session description protocol (SDP) to support multimedia calls through ICS.

H.245 is a control signaling protocol in a H.323 multimedia communication architecture. H.245 is used for the exchange of end-to-end H.245 messages between communicating H.323 endpoints/terminals. The H.245 control messages are carried over H.245 control channels. The H.245 control channel is a logical channel 0 and is permanently open, unlike media channels. The messages carried include messages to exchange capabilities of terminals and to open and close logical channels. After a connection has been set up via a call signaling procedure, a H.245 call control protocol is used to resolve a call media type and to establish a media flow before a call can be established. H.245 is also used to manage the call after the call has been established.

The following embodiments are applicable to a universal mobile telecommunication system (UMTS), a global system for mobile communications (GSM), a code division multiple access (CDMA)-2000 system, a time division-synchronous code division multiple access (TD-SCDMA) system, a wireless local area network (WLAN), a WiMAX system, a 3GPP™ system, a long term evolution (LTE) system, etc. and associated standards of communication. The following embodiments may also comply with 3GPP™ technical specifications and reports, some of which are stated herein and incorporated by reference in their entirety.

Figure 2:
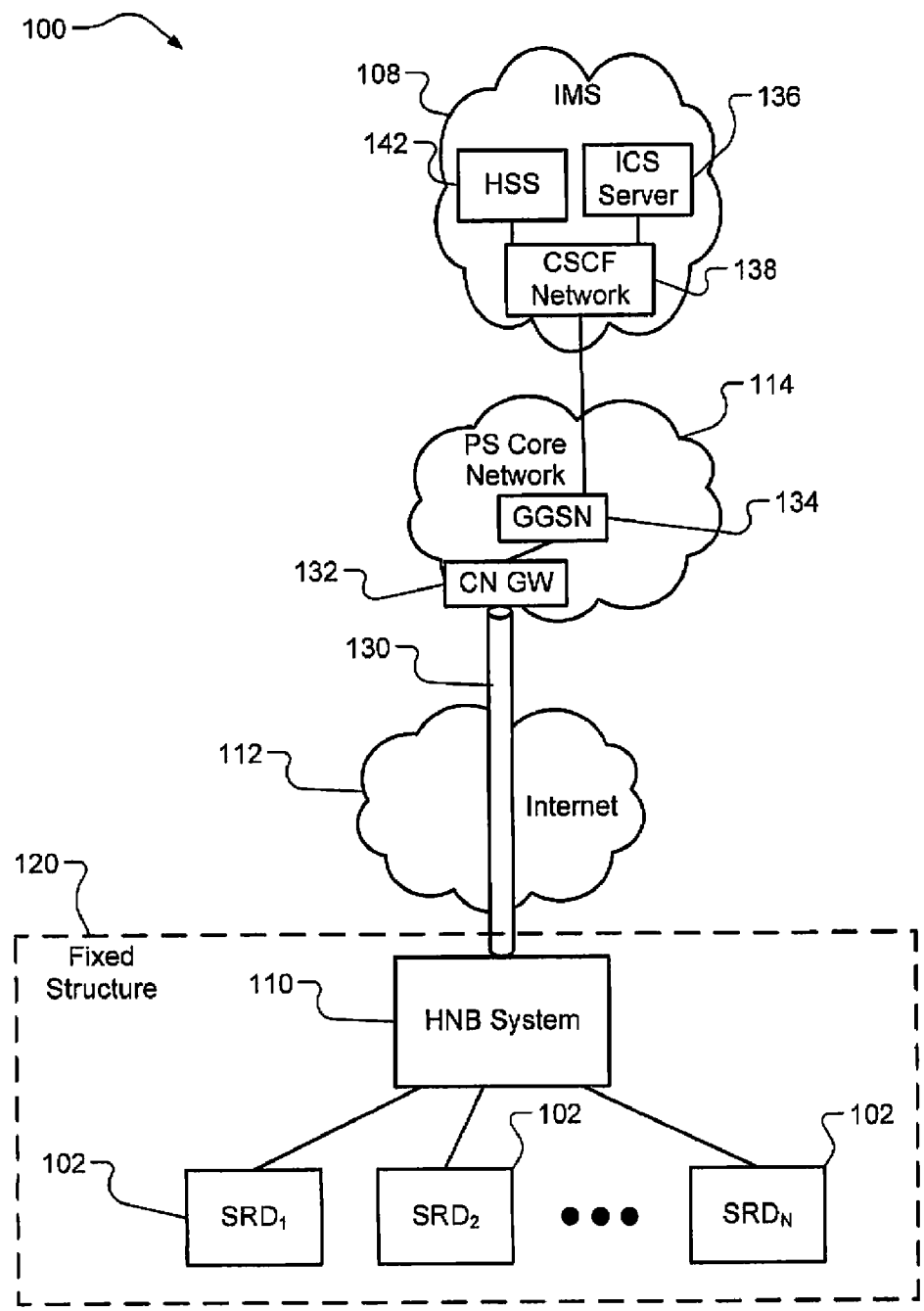
FIG. 2 is a functional block diagram of an IP multimedia system (IMS) centralized services (ICS) network system in accordance with an embodiment of the present disclosure.

In FIG. 2, an ICS network system 100 is shown. The ICS network system 100 includes SRDs 102 that may communicate with an Internet 103 and/or one or more remote networks via a HNB system 106 to obtain ICS. The ICS may be provided by an IMS 108 via the Internet 103, a HNB system 110, and/or a PS core network 114.

The SRDs 102 and the HNB system 110 may be located within a residential or non-residential structure, such as a home, a building, etc., which may be referred to as a fixed structure 120. The HNB system 110 may be implemented as a single module and/or integrated circuit or may include multiple distinct and/or separate elements, modules and/or circuits. The SRDs 102 may be CS and/or PS enhanced. The SRDs 102 may also be ICS or non-ICS enhanced. The HNB system 110 may convert CS domain signals to PS domain signals, such as CS domain signals received from one of the SRDs 102. The HNB system 110 may also convert PS domain signals from the Internet 103 and/or a PS core network 114 to CS domain signals for transmission to the SRDs 102.

The SRDs 102 communicate with the HNB system 110 using CS and/or PS protocols. The HNB system 110 may be ICS and non-ICS enhanced and communicates with the Internet 103 and/or the PS core network 114 via PS protocols. The HNB system 110 may include one or more femtocells, a HNB base station, a MSC server, a media gateway (MGW), etc. and may be fully or partially located in the fixed structure 120. Example femtocells, HNB base stations, MSC servers, and MGWs are provided in FIGS. 3-7. The HNB system 110 may communicate with the Internet 103 and/or the PS core network 114 via a digital subscriber line (DSL) or cable over an IP security (IPsec) tunnel 130.

The IPsec tunnel 130 may be established with a core network (CN) gateway (GW) 132 of the PS core network 114, which includes a GGSN 134. The CN GW 132 may communicate with a GGSN 134 to receive IMS services from an ICS server 136 of the IMS 108 via a CSCF network 138 that may include one or more CSCF entities. The CSCF network and/or one of the CSCF entities may include the ICS server 136. The GGSN 134 may include a location register that stores subscriber data received from a home location register (HLR) and a serving GSN (SGSN). The subscriber data includes subscription information and location information.

The CSCF network 138 includes one or more CSCFs, which are SIP servers that are a point of IMS contact. The CSCF network 138 provides endpoints for registration and routing for SIP messages and enables the messages to be routed to the correct application servers. The CSCF network 138 maintains a quality of service (QoS) level.

The CSCF network 138 may include a proxy-CSCF (P-CSCF), a serving-CSCF (S-CSCF), and an interrogating-CSCF (I-CSCF). A P-CSCF is a SIP proxy that is the first point of contact for an IMS terminal and may be located in a visitor or home network. A S-CSCF is a central node of a signaling plane, performs session control, and is located in a home network. The S-CSCF interfaces with a home subscriber server (HSS) 142 of the IMS 108 to download and upload user profiles. An I-CSCF is a SIP server that is located at an edge of an administration domain.

In operation, the SRDs 102 request and receive ICS from the IMS 108 via the HNB system 110 in a consistent manner for both CS and PS accesses. The HNB system 110 allows for improved connectivity performance within the fixed structure 120 through the use of, for example, a femtocell (not shown). This improves connectivity and allows each of the SRDs 102 may be able to receive telephony and supplemental services. Example femtocell configurations are shown in FIGS. 3-7.

Figure 3:
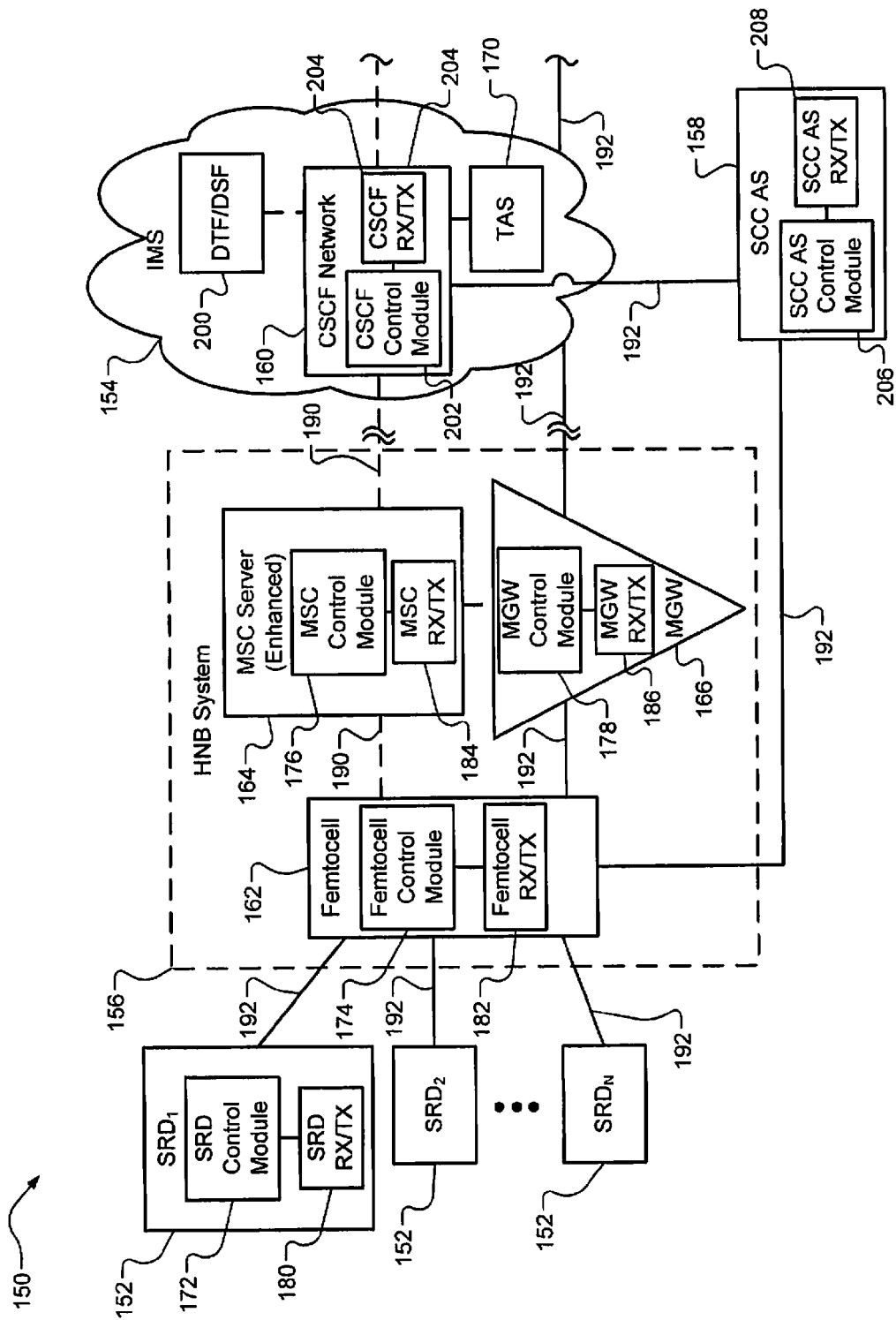
FIG. 3 is a functional block diagram of another ICS network system incorporating an example home node base station (HNB) system in accordance with an embodiment of the present disclosure.

In FIG. 3, an ICS network system 150 is shown. The network system 150 includes SRDs 152 that obtain ICS from an IMS 154 via a HNB system 156 and/or via a service centralization and continuity application server (SCC AS) 158. The HNB system 156 is used for the SRDs 152 that connect using CS and/or PS protocols. The SCC AS 158 is used for the SRDs 152 that connect using PS protocols. The SCC AS 158 may also be used for the SRDs 152 that connect using CS protocols. For example, the SCC AS 158 may be connected between the HNB system 156 and a CSCF network 160 of the IMS 154 and may be part of the IMS 154.

The HNB system 156 includes a femtocell (or HNB) 162, an MSC server 164 that is ICS enhanced, and a MGW 166. The MSC server 164 processes user-network signaling received from the femtocell 162 and performs interworking towards the IMS 154 and vice versa. Call control signaling to setup, originate and terminate bi-directional voice and video calls is interworked between the femtocell 162 and the IMS 154. Service control signaling to manage supplemental services provided and controlled by a telephony application server (TAS) 170 in the IMS 154 are interworked between the femtocell 162 and the IMS 154.

The SRDs 152, the femtocell 162, the MSC server 164, and the MGW 166 respectively include a SRD control module 172, a femtocell control module 174, a MSC control module 176, and a MGW control module 178 and transceivers 180-186. The devices of the HNB system 156 may be fully or partially located in a fixed structure, such as a residential or non-residential structure. For example, the femtocell 162 may be located in the residential or non-residential structure, whereas the MSC server 164 and the MGW 166 may be located externally and remotely from the residential or non-residential structure. The MSC server may be located in a CS core network. The HNB system 156 may be implemented as a single module and/or integrated circuit or may include multiple distinct and/or separate elements, modules and/or circuits.

The dashed signal lines 190 represent control signal lines. The solid signal lines 192 represent user data lines, which may include user data signals and/or control signals. Although signal lines are shown in FIGS. 2-8, communication between devices, elements, and entities shown and described herein may include wired and/or wireless mediums. Non-user data signals and/or control signals are transmitted between the femtocell 162 and the MSC server 164, between the MSC server 164 and the MGW 166, and between the MSC server 164 and the IMS 154. User data signals are transmitted between the femtocell 162 and the MGW 166 and between the MGW 166 and the IMS 154. The MGW 166 is responsible for media processing for calls to or from a CS device and/or network.

The IMS 154 includes a CSCF network 160, a domain transfer function (DTF) and domain selection function (DSF) entity 200, and the TAS 170. The CSCF network 160 may include a CSCF control module 202, a CSCF transceiver 204 and one or more CSCF entities. The DTF and DSF entity 200 handles CS and PF domain transfers and selection. SRD sessions are anchored in the DTF and DSF entity 200 in voice call continuity (VCC) applications. When performing a domain transfer the SRD may communicate in CS and PS domains over the same time period and/or simultaneously.

For example only, when a mobile device or SRD moves between an access network that supports PS and an access network that does not support PS and/or supports CS, VCC is provided. As an example, the SRD may move out of or into an access network associated with a femtocell. VCC and/or other services may be maintained before, during and after the transfer. The transfer may be between a first access network of the femtocell and a second access network that does not include and/or is distinct from the first access network. The first access network and the second access network may be CS and/or PS based. For additional details of DTF and DSF functions see 3GPP™ TS 23.892. The TAS 170 is a back-to-back SIP user agent that maintains a call state. The TAS 170 contains the service logic that provides call processing services including digit analysis, routing, call setup, call waiting, call forwarding, conferencing, etc.

The SCC AS 158 includes a SCC AS control module 206 and a SCC AS transceiver 208 and enables ICS. An initial session may be anchored in the SCC AS 158 before a session transfer between domains is invoked. The initial session may be routed to the SCC AS 158 regardless of whether the corresponding call is initiated from the CS domain or the PS/IMS domain. The SCC AS 158 correlates different call legs before and after mobility. The SCC AS 158 may execute a session transfer between different access networks. The SCC AS 158 is inserted in the session path using an originating and terminating initial filter criteria (iFC) and may be configured as a first AS in an originating iFC and as a last AS in a terminating iFC chain. The SCC AS 158 may also be invoked through the use of public service identifier (PSI) termination procedures when using CS access. The SCC AS 158 may perform functions associated with an ICS user agent (IUA), CS access adaptation (CM), and terminating access domain selection (T-ADS). Additional functions of the SCC AS are described in 3GPP™ TS 23.292.

In operation, CS access signaling may be used between the femtocell 162 and the MSC server 164. The MSC server 164 converts CS signaling to PS or IMS signaling, which includes SIP protocols. Enhanced MSC functionality for ICS is described in 3GPP™ TS 23.292, which is incorporated herein by reference in its entirety. The MSC server 164 and/or MSC control module 176 is configured to communicate with the femtocell 162. The MSC server 164 may use protocols commonly used between an MSC server and a radio network controller and/or base station, such as a nodeB base station.

A non-ICS SRD may experience basic voice service origination and termination sessions. When an SRD is in a network upgraded with ICS, voice origination and termination service sessions with supplemental services may be controlled through the IMS 154. When an SRD is in a network that is not upgraded with ICS, voice origination and termination service sessions with communication barring services and communication diversion services may be controlled through the IMS 154. A VCC-capable ICS SRD may exhibit domain transfers of basic voice service sessions in both directions and voice sessions with non-mid call (supplemental) services in both directions. Domain transfers may refer to transfers of services between CS and PS and/or IMS domains.

A non-ICS SRD may establish an IMS and/or ICS session using signaling and bearer paths via a CS access. The CS access may be established using the MSC server 164 by presenting a single SIP session. CS access signaling may be terminated by the enhanced MSC server 164. The MSC server 164 may perform interworking, have control and comply with procedures described in 3GPP™ TS 24.008 "Mobile Radio Interface Layer 3 Specification, Core Network Protocols", which is incorporated herein by reference in its entirety.

The MSC server 164 presents SIP user agent (UA) behavior on behalf of a SRD toward IMS. Use of direct SIP signaling between the MSC server 164 and the CSCF network 160 enables capability to provide telephony services exclusively from the IMS 154. As use of the direct SIP signaling between the MSC server 164 and the CSCF network 160 enables the capability to provide telephony services exclusively from the IMS 154, telephony and supplemental services are provided via the IMS 154.

For SRDs not identified as ICS enhanced devices, the MSC server 164 functionality is unchanged relative to SRDs that are identified as ICS enhanced devices. An ICS enhanced SRD may be supported without enhancements to the MSC server 164 for reception of ICS.

Standards for CS and PS security mechanisms between the femtocell 162 and a macro-cell network may be used. In case of PS, the direct path between the femtocell 162 and the CSCF network 160 is established for registration and session control. Additional servers and/or entities over the MSC server 164 are not needed for reception of ICS in the HNB system 156. The MSC server 164 may comply with 3GPP™ standards.

The ICS system 150 may use cellular security mechanisms for CS and PS. The ICS system 150 provides IMS services to the SRDs 152, such that the experience of the SRDs 152 when receiving services is unchanged between CS and PS domains.

Figure 4:
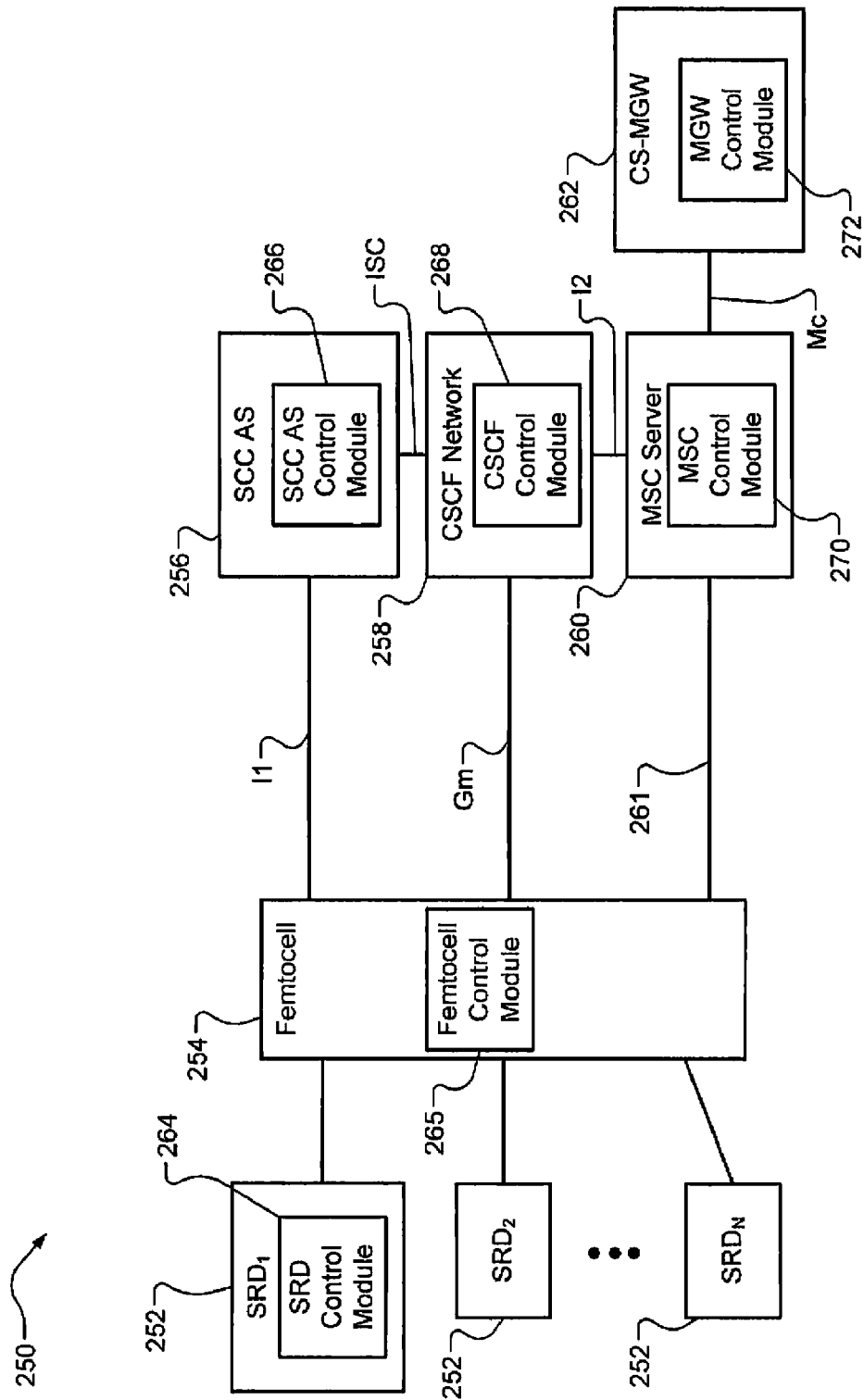
FIG. 4 is a functional block diagram of another ICS network system illustrating a circuit switched (CS) and packet switched (PS) access in accordance with an embodiment of the present disclosure.

In FIG. 4, an ICS network system 250 is shown. The network system 250 includes SRDs 252 that may access IMS services of an IMS via a femtocell 254. The femtocell 254 communicates with a SCC AS 256, a CSCF network 258, and/or a MSC server 260. The MSC server 260 is enhanced for IMS sessions based on a CS access 261. The MSC server 260 may communicate with a CS-MGW 262 via interface Mc. The SRDs 252, the femtocell 254, the SCC AS 256, the CSCF network 258, the MSC server 260, and the CS-MGW 262 may have respectively a SRD control module 264, a femtocell control module 265, a SCC AS control module 266, a CSCF control module 268, a MSC control module 270 and a CS-MGW control module 272 and respective transceivers (not shown).

The architecture of the network system 250, as shown allows for a non-ICS enhanced SRDs 252 to access IMS services. The SRDs 252 may be CS or PS enhanced. IMS sessions that correspond with CS sessions include data signaling via an interface Gm between the femtocell 254 and the CSCF network 258 and control signaling via the CS access 261. The MSC server 260 may communicate with the CSCF network 258 via interface 12. IMS sessions that correspond with PS sessions include control and data signaling via interface 11 between the femtocell 254 and the SCC AS 256. The SCC AS 256 communicates with the CSCF network 258 via interface ISC. The SCC AS 256 provides functions specific to IMS service centralization and continuity. The MSC server 260 is enhanced for ICS.

Figure 5:
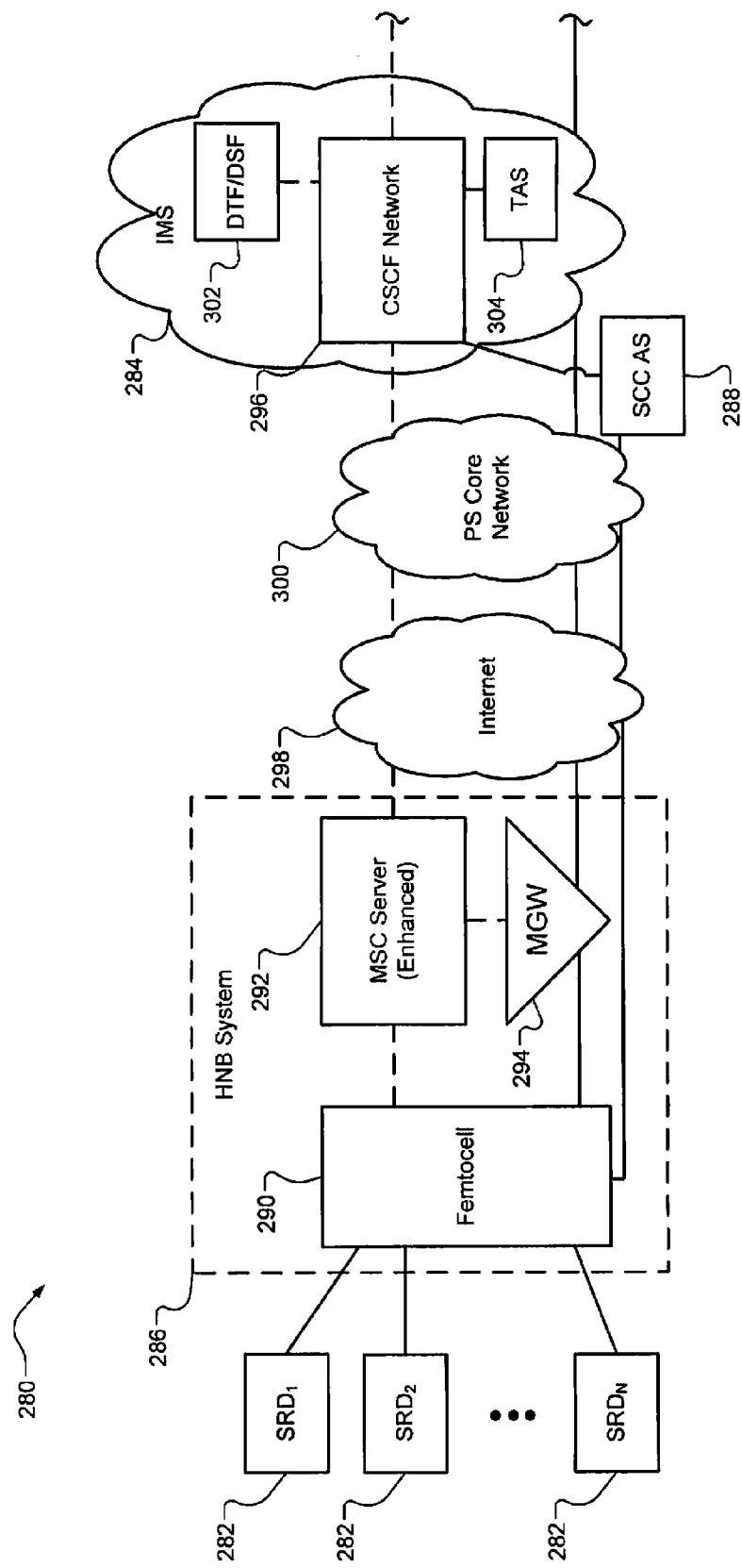
FIG. 5 is a functional block diagram of another ICS network system illustrating ICS reception via an Internet and a PS core network in accordance with an embodiment of the present disclosure.

In FIG. 5, an ICS network system 280 is shown. The ICS network system 280 includes SRDs 282 that obtain ICS from an IMS 284 via a HNB system 286 and/or via a SCC AS 288. The HNB system 286 includes a femtocell 290, a MSC server 292 that is enhanced for ICS and a MGW 294. The HNB system 286 is used for SRDs 282 that connect using CS protocols. The femtocell 290 and the SCC AS 288 are used for the SRDs 282 that connect using PS protocols. The SCC AS 288 may also be used for the SRDs 282 that connect using CS protocols. For example, the SCC AS 288 may be connected between the MSC server 292 and the CSCF network 296. The SCC AS 288 may communicate with a CSCF network 296 of the IMS 284 to receive ICS. The SCC AS 288 may communicate with the CSCF network 296 via an Internet 298 and a PS core network 300.

The HNB system 286 may be fully or partially located within a residential or non-residential structure. The HNB system 286 communicates with the CSCF network 296 via the Internet 298 and the PS core network 300. The CSCF network 296 communicates with a DTF and DSF entity 302 and a TAS 304. The MSC server 292 may communicate with the CSCF network 296 of the IMS 284 via a CN GW and/or a GGSN of the PS core network 300 as shown in FIG. 2. Communication with the CN GW may be via a DSL secure tunnel and via the Internet.

Figure 6:
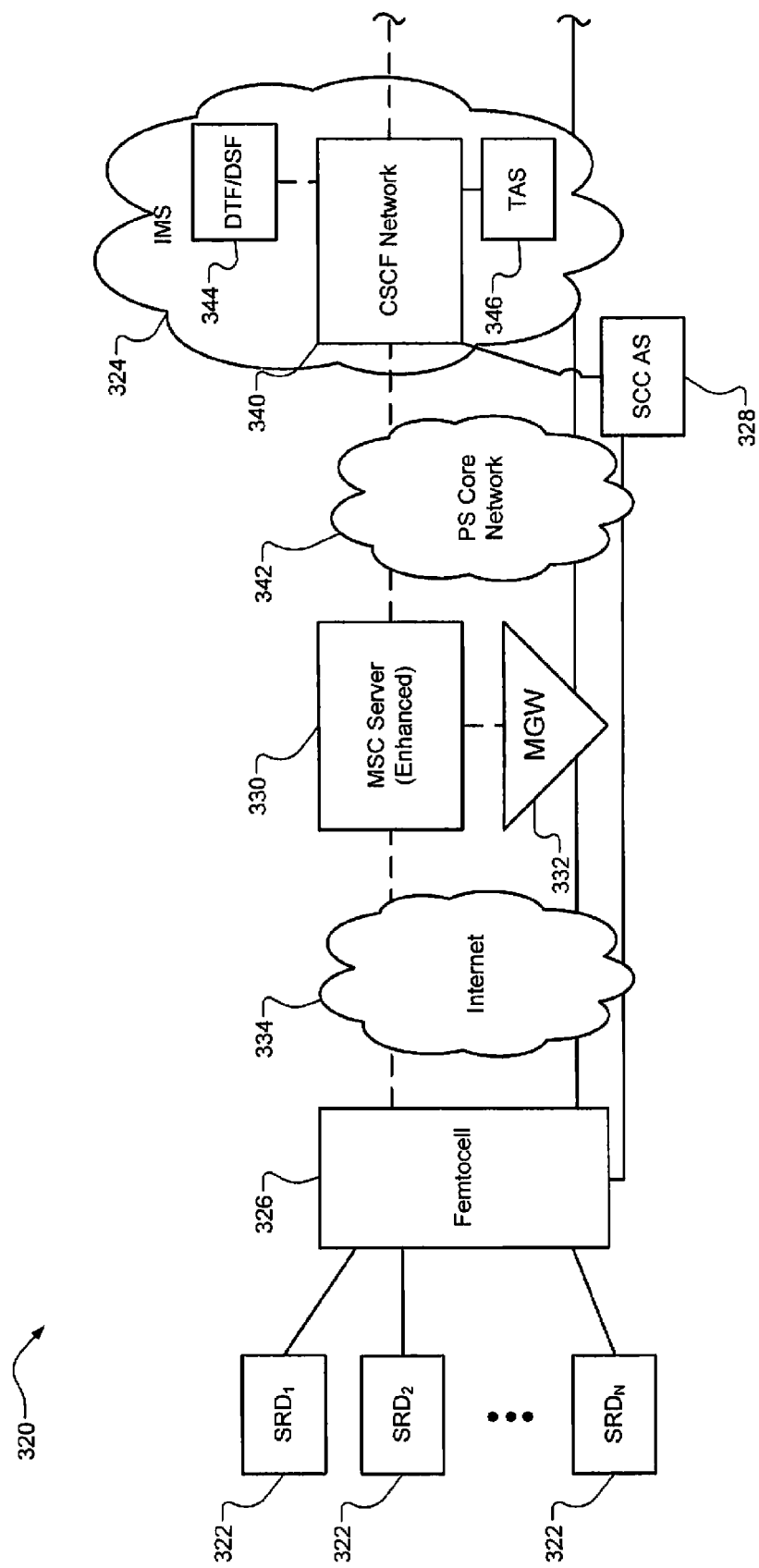
FIG. 6 is a functional block diagram of another ICS network system illustrating ICS reception via a remote mobile switch center and media gateway in accordance with an embodiment of the present disclosure.

In FIG. 6, an ICS network system 320 is shown. The ICS network system 320 includes SRDs 322 that obtain ICS from an IMS 324 via a femtocell 326 and/or via a SCC AS 328. The femtocell 326 may connect to a MSC server 330 and to a MGW 332 via an Internet 334 for the SRDs 322 that connect using CS protocols. The femtocell 326 and the SCC AS 328 are used for the SRDs 322 that connect using PS protocols. The SCC AS 328 may also be used for the SRDs 322 that connect using CS protocols. For example, the SCC AS 328 may be connected between the MSC server 330 and the CSCF network 340. The SCC AS 328 may communicate with a CSCF network 340 of the IMS 324 to receive ICS. The MSC server 330 is ICS enhanced. The MSC server 330 and the MGW 332 communicate with the CSCF network 340 via a PS core network 342. The CSCF network 340 communicates with a DTF and DSF entity 344 and a TAS 346.

Figure 7:
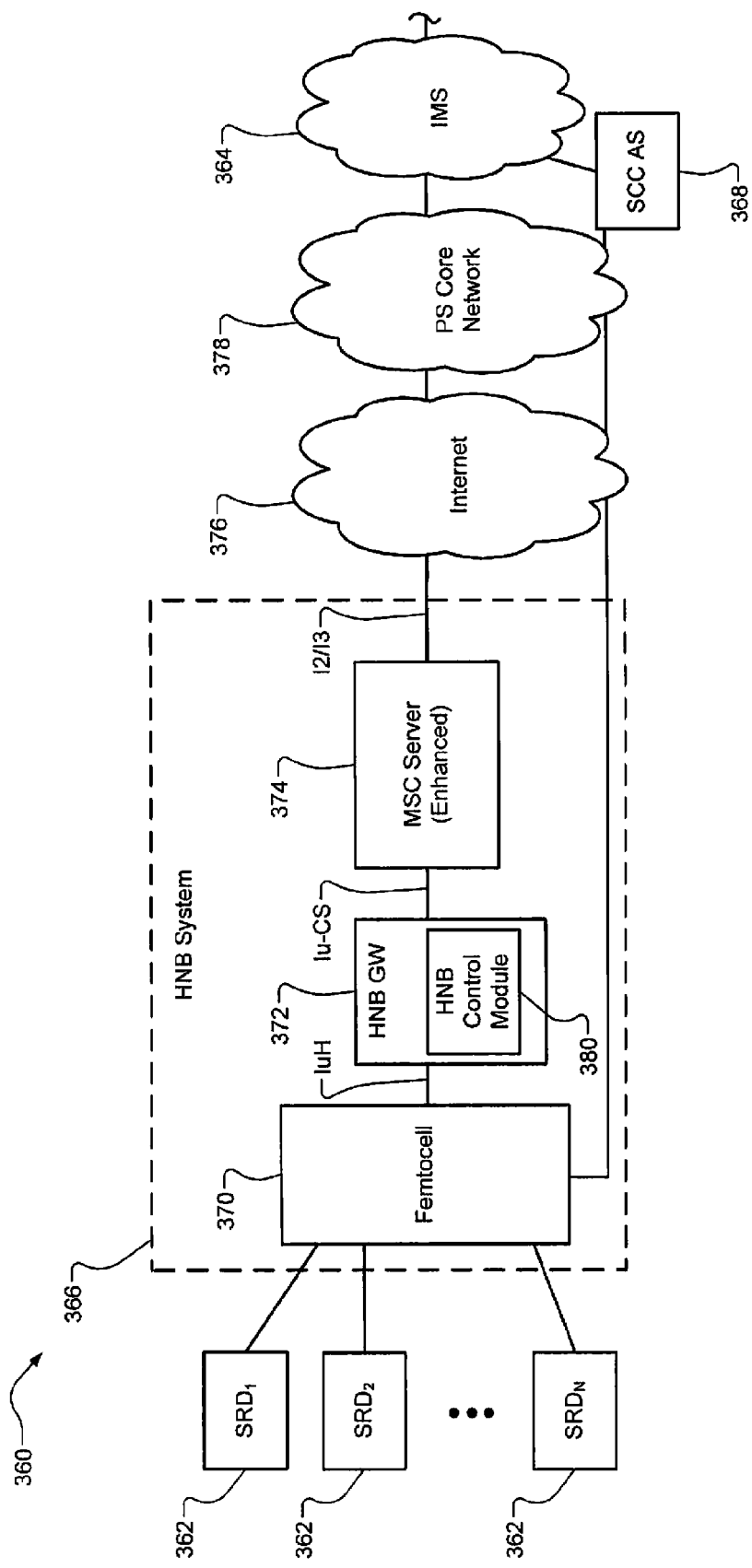
FIG. 7 is a functional block diagram of another ICS network system illustrating another example HNB system in accordance with an embodiment of the present disclosure.

In FIG. 7, an ICS network system 360 is shown. The ICS network system 360 includes SRDs 362 that obtain ICS from an IMS 364 via a HNB system 366 and/or via a SCC AS 368. The HNB system 366 includes a femtocell 370, a HNB GW 372 and a MSC server 374 that is enhanced for ICS. The HNB system 366 is used for the SRDs 362 that connect using CS protocols. The femtocell 370 and the SCC AS 368 are used for SRDs 362 that connect using PS protocols. The SCC AS 368 may also be used for the SRDs 362 that connect using CS protocols. For example, the SCC AS 368 may be connected between the MSC server 374 and a CSCF network of the IMS 364. The SCC AS 368 may communicate with a CSCF network of the IMS 364. This communication may be via an Internet 376 and a PS core network 378.

The HNB system 366 may be fully or partially located within a residential or non-residential structure. The HNB system 366 may be implemented as a single module and/or integrated circuit or may include multiple distinct and/or separate elements, modules and/or circuits. The HNB gateway 366 may include a HNB control module 380 and the MSC server 374 may be located with the structure or external and remote from the structure. The HNB system 366 may communicate with the IMS 364 to receive ICS for one or more of the SRDs 362.

The MSC server 374 processes user-network signaling received from the femtocell 370 via the HNB gateway 372 and performs interworking towards the IMS 364 and vice versa. Call control signaling to setup originating and terminating bi-directional voice and video calls are interworked between the HNB gateway 372 and the IMS 364. Service control signaling to manage supplemental services provided and controlled by a TAS in the IMS 364 are interworked between the HNB gateway 372 and the IMS 364.

IMS functionality (i.e. SIP UA) is provided by the MSC server 374. The SRDs 362, the femtocell 370, the HNB gateway 372 do not need to be IMS enhanced. The femtocell may communicate with the HNB gateway via an IuH interface. The MSC server 374 may connected to the HNB gateway 372 via interface Iu-cs and to the IMS 364 via interfaces I2 and I3, which are provided in 3GPP™ TS 23.292. The MSC server 374 may be connected to the IMS 364 via the Internet 376 and a PS core network 378, as shown.

Figure 8:
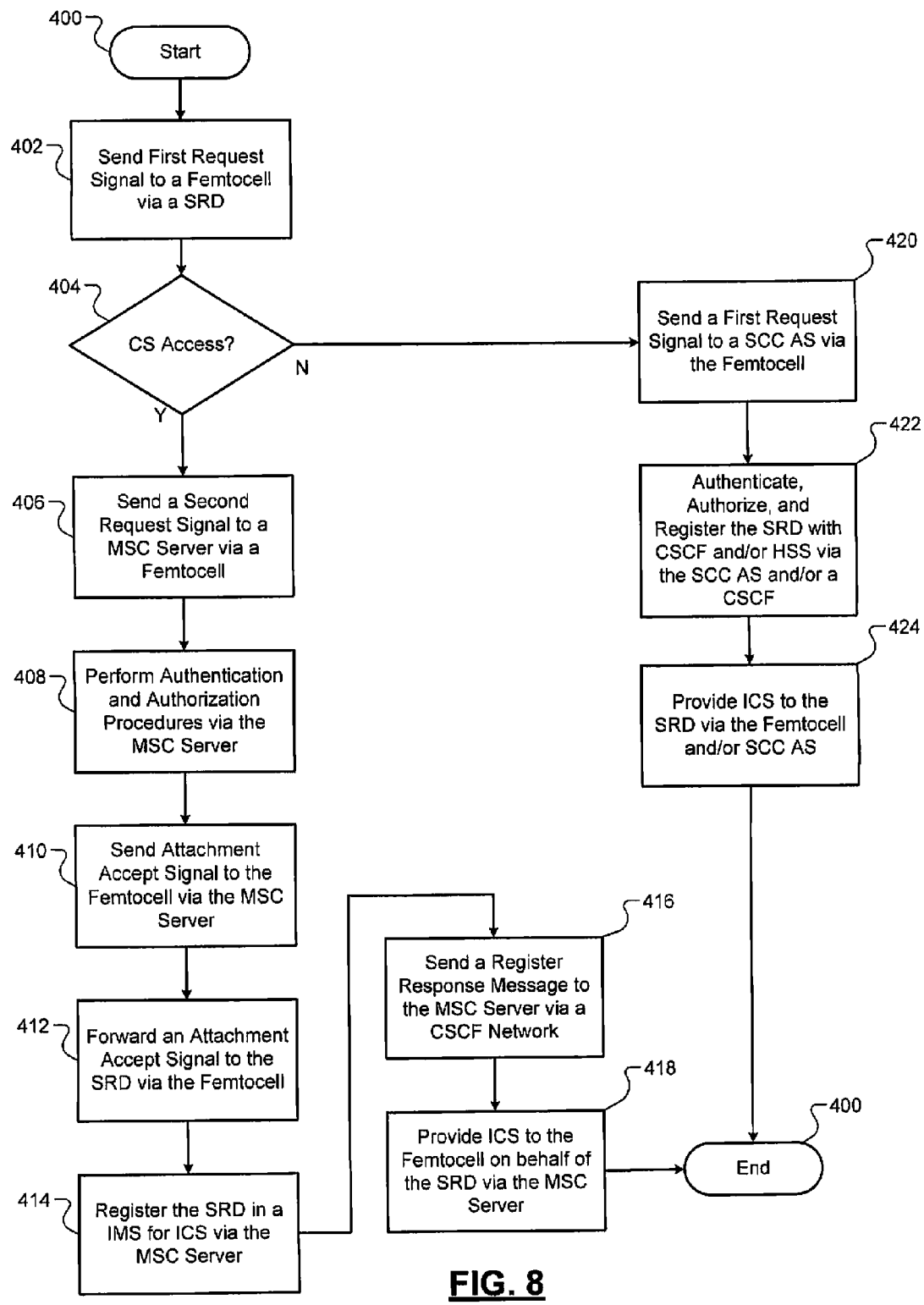
FIG. 8 illustrates a method of providing service request device (SRD) registration and ICS reception in an ICS network system in accordance with an embodiment of the present disclosure.

FIG. 8 illustrates method of non-ICS SRD registration and ICS service in accordance with an embodiment of the disclosure. The registration and service reception is performed via a HNB system and/or via a MSC server enhanced for ICS. The method may apply to the embodiments of FIGS. 2-7. The method may begin at step 400.

In step 402, a SRD transmits a first request signal to a femtocell via a SRD transceiver. The first request signal may include an attachment message and a service request message indicating services requested by the SRD. The femtocell may be located in a HNB system. The SRD may be CS or PS based.

In step 404, when the SRD is CS based and/or is accessing the IMS via a CS bearer, step 406 is performed. When the SRD is PS based and/or is accessing an IMS via a PS or IMS bearer, step 420 is performed. This decision may be performed by a femtocell control module.

A bearer may refer to a tunnel, addresses, a quality of service (QofS), etc. that corresponds to a SRD or femtocell and a gateway, a server, and/or other entity that provide the IP services. A tunnel may be setup based on network capabilities, subscriber information, authentication and authorization of the SRD, etc. Access network bearers may be established for an ongoing Internet session of the SRD. An SRD context may include a set of addresses allocated to the SRD. The addresses may include a PDN gateway address, a PDN address, a serving gateway address, etc.

In step 406, the femtocell sends a second request message to a MSC server that is enhanced for ICS via a femtocell transceiver. The second request signal may be transmitted via a HNB gateway and based on the first request signal. The femtocell may communicate with the MSC server in the CS domain.

In step 408, the MSC server may perform authentication and authorization procedures. The MSC server may communicate with a CSCF network and/or a home subscriber server (HSS) of the IMS via a MSC transceiver. The MSC server may send and/or receive SRD and/or subscriber information to and from the CSCF network and the HSS. The communication between the MSC server and the CSCF network may be in the PS domain.

In step 410, the MSC server may send an attachment accept signal to the femtocell via the MSC server transceiver based on the authentication and authorization performed in step 408. In step 412, the femtocell may forward the attachment accept signal to the SRD.

In step 414, the MSC server may register the SRD in the IMS for ICS. The MSC server determines the address of the CSCF network and sends a trusted SIP register to the IMS with information, such as a temporary public user identity, a MSC server address, etc. to the CSCF network. The CSCF network may identify the register as a trusted registration from the MSC server and perform service control execution.

In step 416, the CSCF network may send a register response message to the MSC server. In step 418, when the SRD has requested services, the MSC server may then provide ICS to the femtocell for the SRD. After registration, ICS may be provided to the SRD as requested by the SRD and/or as permitted by the MSC server and the IMS.

In step 420, the femtocell sends a third request signal, which may include an attachment request message, to a SCC AS. The attachment request signal may be transmitted via an Internet and/or a PS core network. The femtocell may communicate with the SCC AS in the PS domain. In step 422, the SCC AS may communicate with a CSCF network and/or a HSS to authenticate, authorize and register the SRD via femtocell access based on the third request signal.

In step 424, when the SRD has requested certain services, the SCC AS may provide the services via IMS to the SRD via the femtocell. After registration, ICS may be provided to the SRD as requested by the SRD and/or as permitted by the MSC server and the IMS. Although steps 420-424 are described with respect to the SRD obtaining ICS via a femtocell, a PS or IMS based SRD may obtain ICS access via a mobile network or other network that does not include the femtocell.

After registration, session establishment between SRDs via the IMS may be setup. This may include the transmission of invite signals, call setup signals between a first SRD, a second SRD, the femtocell, the MSC server, the MGW, the SCC AS, the CSCF network, the Internet, and/or the PS core network. CS and/or PS and/or IMS domain bearers may be setup.

The above-described steps in FIG. 8 are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A femtocell comprising:
a transceiver that receives a first request signal from a first service request device (SRD) that operates in at least one of a circuit switched (CS) domain and a packet switched (PS) domain; and
a control module that generates a second request signal based on the first request signal,
wherein
the transceiver transmits the second request signal in at least one of the CS domain and the PS domain from the femtocell to a mobile switch center (MSC) server,
the transceiver provides Internet protocol multimedia subsystem (IMS) centralized services (ICS) to the first SRD based on the second request signal,
the transceiver receives the first request signal in the CS domain and transmits the second request signal in the CS domain,
the transceiver receives a third request signal from a second SRD,
the control module generates a fourth request signal based on the third request signal,
the transceiver transmits the fourth request signal in a packet switched domain to a service centralization and continuity application server (SCC AS), and
the transceiver provides the ICS to the second SRD based on the fourth request signal.

2. The femtocell of claim 1, wherein the control module is ICS enhanced.

3. The femtocell of claim 1, wherein the first SRD is ICS enhanced.

4. The femtocell of claim 1, wherein the transceiver transmits and receives control signals for the ICS to and from the MSC server and transmits and receives user data signals for the ICS to and from a media gateway.

5. The femtocell of claim 1, wherein the transceiver transmits and receives control signals for the ICS to and from the MSC server and transmits and receives user data signals for the ICS to and from a call state control function entity.

6. The femtocell of claim 1, wherein the ICS is provided to the femtocell via an Internet.

7. The femtocell of claim 1, wherein the ICS is provided to the femtocell via a PS core network.

8. An ICS system comprising the femtocell of claim 1 and further comprising the MSC server, wherein the MSC server is ICS enhanced and converts CS domain signals from the femtocell to at least one of PS domain signals and IMS domain signals.

9. An ICS system comprising the femtocell of claim 1 and further comprising the MSC server and a gateway,
wherein the transceiver transmits and receives control signals for the ICS to and from the MSC server and transmits and receives user data signals for the ICS to and from the gateway.

10. The ICS system of claim 9, wherein the femtocell and the MSC server are located in a fixed structure.

11. The ICS system of claim 10 further comprising a call state control function (CSCF) entity of an IMS that provides the ICS to the femtocell.

12. The ICS system of claim 11 further comprising a domain transfer function entity and a domain selection function entity that communicate with the CSCF entity and that controls transfer of the first SRD between the CS domain and the PS domain.

13. The ICS system of claim 11 further comprising a telephony application server that communicates with the CSCF entity and that maintains a call state of the first SRD.

14. A home node base station system comprising:
a femtocell that comprises:
a transceiver that receives a first request signal from a service request device (SRD) that operates in at least one of a circuit switched (CS) domain and a packet switched (PS) domain; and
a control module that generates a second request signal based on the first request signal,
a home node base station gateway that communicates with the femtocell; and
a mobile switch center (MSC) server that communicates with the home node base station gateway and an Internet protocol multimedia subsystem (IMS),
wherein the transceiver transmits the second request signal in at least one of the CS domain and the PS domain from the femtocell to the MSC server, and
wherein the transceiver provides IMS centralized services (ICS) to the SRD based on the second request signal.

15. The home node base station system of claim 14, wherein the femtocell, the home node base station gateway and the MSC server are located in a fixed structure.

16. A method of operating a system that includes a femtocell comprising:
receiving a first request signal by the femtocell via a transceiver and from a service request device (SRD) that operates in at least one of a circuit switched (CS) domain and a packet switched (PS) domain;
generating a second request signal via a control module and based on the first request signal;
transmitting the second request signal in at least one of the CS domain and the PS domain from the femtocell to a mobile switch center (MSC) server; and
providing Internet protocol multimedia subsystem (IMS) centralized services (ICS) to the SRD based on the second request signal,
wherein
the transceiver receives the first request signal in the CS domain and transmits the second request signal in the CS domain,
the transceiver receives a third request signal from a second SRD,
the control module generates a fourth request signal based on the third request signal,
the transceiver transmits the fourth request signal in a packet switched domain to a service centralization and continuity application server (SCC AS), and
the transceiver provides the ICS to the second SRD based on the fourth request signal.

17. The method of claim 16 wherein the transceiver transmits and receives control signals for the ICS to and from the MSC server and transmits and receives user data signals for the ICS to and from a gateway,
wherein the femtocell and the MSC server are located in a fixed structure, and
wherein the method further comprises
providing the ICS to the femtocell via a call state control function (CSCF) entity of an IMS, and
controlling transfer of the first SRD between the CS domain and the PS domain via a domain transfer function entity and a domain selection function entity via communication with the CSCF entity.

18. The method of claim 16 wherein the transceiver transmits and receives control signals for the ICS to and from the MSC server and transmits and receives user data signals for the ICS to and from a gateway,
 wherein the femtocell and the MSC server are located in a fixed structure, and
 wherein the method further comprises
  providing the ICS to the femtocell via a call state control function (CSCF) entity of an IMS, and
  communicating with the CSCF entity to maintain a call state of the first SRD via a telephony application server.

19. A method of operating a home node base station system comprising:
 receiving a first request signal by a femtocell via a transceiver and from a service request device (SRD) that operates in at least one of a circuit switched (CS) domain and a packet switched (PS) domain;
 generating a second request signal via a control module and based on the first request signal;
 transmitting the second request signal in at least one of the CS domain and the PS domain from the femtocell to a mobile switch center (MSC) server via a home node base station gateway; and
 providing IMS centralized services (ICS) from an Internet protocol multimedia subsystem (IMS) to the SRD based on the second request signal.

20. The method of claim 19 wherein the transceiver receives the first request signal in the CS domain,
 wherein the transceiver transmits the second request signal in the CS domain,
 wherein the transceiver receives a third request signal from a second SRD,
 wherein the control module generates a fourth request signal based on the third request signal,
 wherein the transceiver transmits the fourth request signal in a packet switched domain to a service centralization and continuity application server (SCC AS), and
 wherein the transceiver provides the ICS to the second SRD based on the fourth request signal.

21. The method of claim 19 wherein the transceiver transmits and receives control signals for the ICS to and from the MSC server and transmits and receives user data signals for the ICS to and from a gateway,
 wherein the femtocell and the MSC server are located in a fixed structure, and
 wherein the method further comprises
  providing the ICS to the femtocell via a call state control function (CSCF) entity of an IMS, and
  communicating with the CSCF entity to control transfer of the first SRD between the CS domain and the PS domain via a domain transfer function entity and a domain selection function entity.

22. The method of claim 19 wherein the transceiver transmits and receives control signals for the ICS to and from the MSC server and transmits and receives user data signals for the ICS to and from a gateway,
 wherein the femtocell and the MSC server are located in a fixed structure, and
 wherein the method further comprises
  providing the ICS to the femtocell via a call state control function (CSCF) entity of an IMS, and
  communicating with the CSCF entity to maintain a call state of the first SRD via a telephony application server.

23. A method of service request device (SRD) registration and ICS service comprising:
 receiving a first request signal by a femtocell from a non-Internet protocol multimedia subsystem (IMS) centralized services (ICS) SRD that operates in at least one of a circuit switched (CS) domain and a packet switched (PS) domain;
 generating a second request signal and transmitting the first request signal to a service centralization and continuity application server (SCC AS) via the femtocell based on domain of the non-ICS SRD;
 registering the non-ICS SRD via a mobile switch center (MSC) server when the second request signal is generated;
 registering the non-ICS SRD via at least one of the SCC AS and a call state control function (CSCF) when the first request signal is transmitted to the SCC AS; and
 providing ICS to the non-ICS SRD based on one of the first request signal and the second request signal.

24. The method of claim 23 wherein the first request signal comprises at least one of an attachment message and a service request message.

25. The method of claim 23 wherein the generating of the second request signal is based on the first request signal when the non-ICS SRD is CS based, and
 wherein the first request signal is transmitted to the SCC AS via the femtocell when the non-ICS SRD is PS based.

26. The method of claim 25 further comprising:
 transmitting the second request signal in at least one of the CS domain and the PS domain from the femtocell to the MSC server; and
 providing ICS to the non-ICS SRD based on the second request signal.

\* \* \* \* \*